United States Patent
Ueyama

(10) Patent No.: US 8,676,047 B2
(45) Date of Patent: Mar. 18, 2014

(54) IMAGE CAPTURE APPARATUS AND METHOD OF CONTROLLING THE SAME

(75) Inventor: Teruhiko Ueyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 13/179,605

(22) Filed: Jul. 11, 2011

(65) Prior Publication Data

US 2012/0027390 A1 Feb. 2, 2012

(30) Foreign Application Priority Data

Jul. 29, 2010 (JP) .................................. 2010-171178

(51) Int. Cl.
  *G03B 17/00* (2006.01)
(52) U.S. Cl.
  USPC ........................................ 396/50; 348/333.02
(58) Field of Classification Search
  USPC ........................................ 396/50; 348/333.02
  See application file for complete search history.

(56) References Cited

U.S. PATENT DOCUMENTS

| | | | |
|---|---|---|---|
| 5,937,213 A * | 8/1999 | Wakabayashi et al. | 396/50 |
| 2007/0047126 A1 * | 3/2007 | Kobayashi et al. | 360/60 |
| 2008/0204566 A1 * | 8/2008 | Yamazaki et al. | 348/208.99 |
| 2011/0025901 A1 * | 2/2011 | Tsubusaki | 348/333.12 |

FOREIGN PATENT DOCUMENTS

| | | |
|---|---|---|
| CN | 101572776 A | 11/2009 |
| JP | 2009-092526 | 4/2009 |
| JP | 2009-261030 | 11/2009 |

OTHER PUBLICATIONS

The above reference was cited in a Jul. 30, 2013 Chinese Office Action, which is enclosed with English Translation, that issued in Chinese Patent Application No. 201110217043.1.

* cited by examiner

*Primary Examiner* — Rodney Fuller
*Assistant Examiner* — Fang-Chi Chang
(74) *Attorney, Agent, or Firm* — Cowan, Liebowitz & Latman, P.C.

(57) ABSTRACT

An image capture apparatus comprises an inclination detection unit which detects an inclination of the image capture apparatus, a display unit which displays the inclination of the image capture apparatus, and a predetermined reference orientation set for the image capture apparatus, a still state determination unit which determines that the image capture apparatus is in a still state, if a variation of the inclination falls within a predetermined range, and a reference orientation setting unit which sets the reference orientation of the image capture apparatus, wherein the reference orientation setting unit does not set the reference orientation if the still state determination unit determines that the image capture apparatus is not in the still state.

12 Claims, 6 Drawing Sheets

ORIENTATION IN WHICH ZERO POINT POSITION CORRECTION IS IMPOSSIBLE

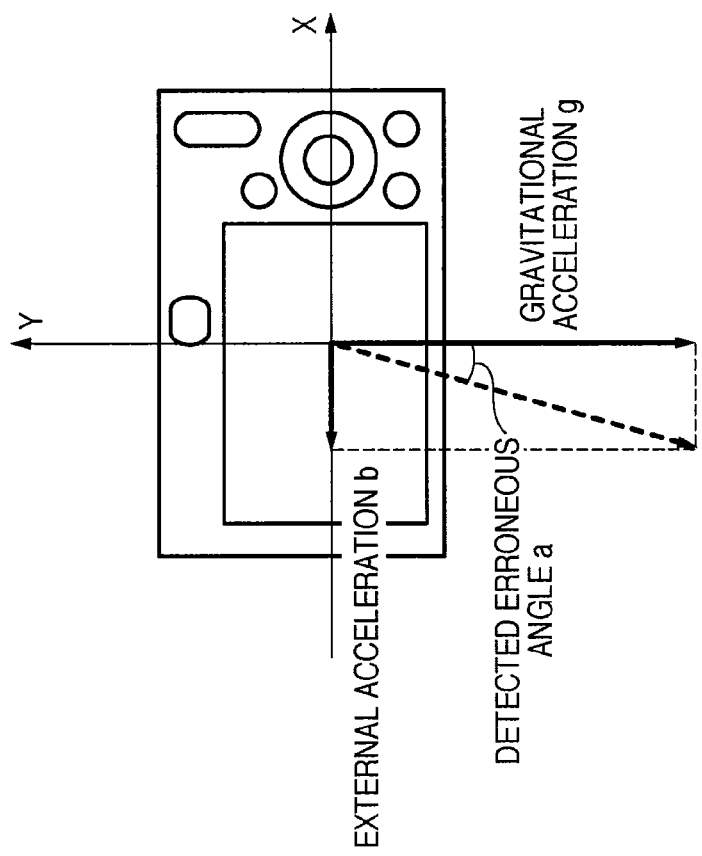
FIG. 2B
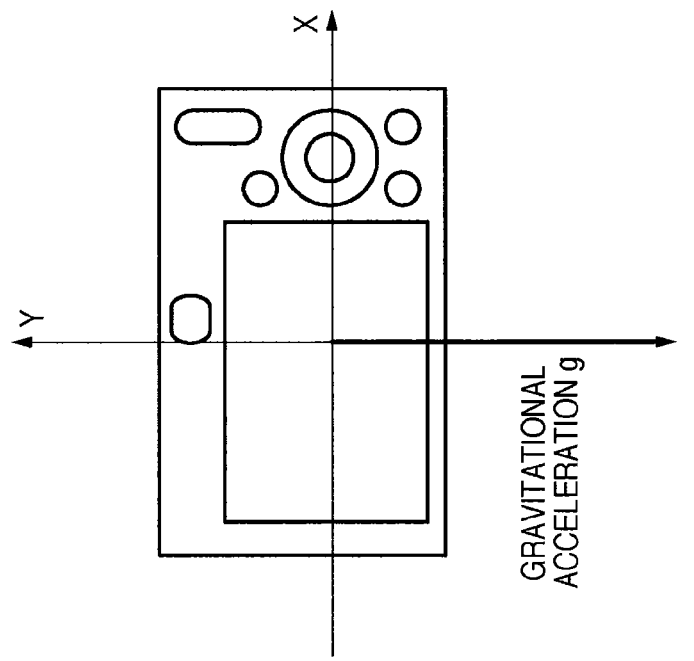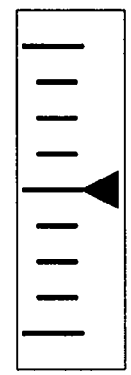
FIG. 2A

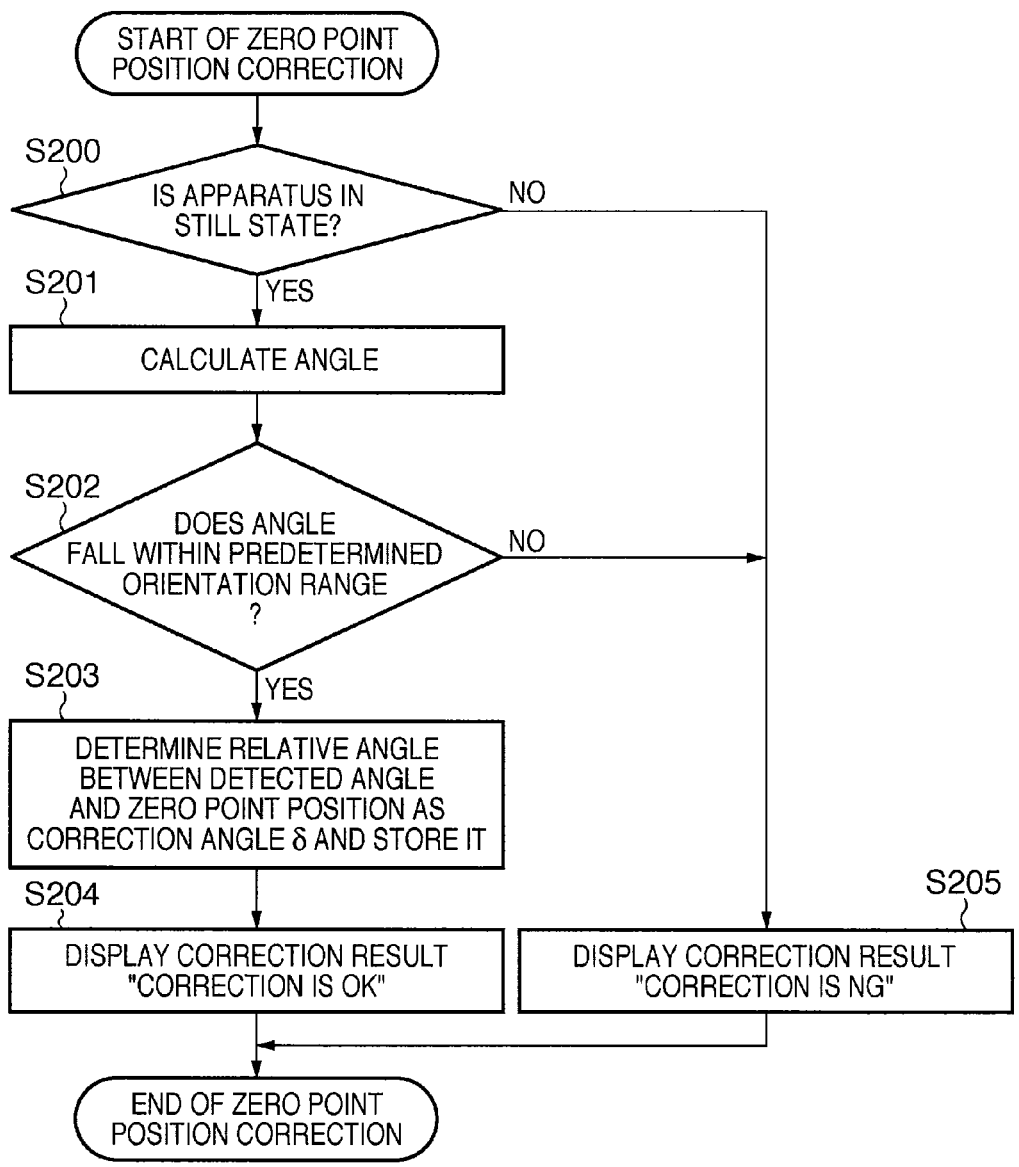

ORIENTATION IN WHICH ZERO POINT POSITION CORRECTION IS POSSIBLE

ORIENTATION IN WHICH ZERO POINT POSITION CORRECTION IS IMPOSSIBLE

IMAGE CAPTURE APPARATUS AND METHOD OF CONTROLLING THE SAME

BACKGROUND OF THE INVENTION

1. Field of the Invention

The present invention relates to an image capture apparatus and, more particularly, to an image capture apparatus having a function of detecting its orientation inclination.

2. Description of the Related Art

In recent years, an image capture apparatus such as a digital camera can detect its inclination angle by detecting the direction of gravity using, for example, an acceleration sensor. Thus, a photograph with no inclination can be captured by notifying the photographer of the inclination of the image capture apparatus. The orientation of an image capture apparatus in the direction of gravity can also be detected by mounting a gravity sensor such as an acceleration sensor in it, so the number of image capture apparatuses which implement a electronic level function is increasing.

Japanese Patent Laid-Open No. 2009-261030, for example, discloses a technique of displaying the inclination status of an image capture apparatus with respect to the horizontal level on its display screen using its inclination information with respect to the direction of gravity. Also, Japanese Patent Laid-Open No. 2009-92526 discloses a technique of adjusting the zero point by rotating the main body of an electronic level which uses an acceleration sensor through 180°.

However, the output value of a sensor such as an acceleration sensor for use in inclination detection changes in response to a change in environment such as temperature, thus posing a problem that the zero point position indicating the horizontal level may shift depending on the use environment.

As one method of solving this problem, zero point position correction by the user is known. An image capture apparatus is fixed horizontally, and the zero point position of a electronic level is corrected using the output value of an acceleration sensor at that time. However, this method results in erroneous zero point position correction without detecting a correct zero point if the output value of a sensor which detects the inclination varies due to the influence of vibration or an acceleration other than a gravitational acceleration during zero point position correction.

SUMMARY OF THE INVENTION

The present invention has been made in consideration of the above-mentioned problem, and prevents erroneous zero point position correction without detecting a correct zero point if the output value of a sensor which detects the inclination varies due to the influence of vibration or an acceleration other than a gravitational acceleration during zero point position correction in an image capture apparatus including the sensor.

According to the first aspect of the present invention, there is provided an image capture apparatus comprising: an inclination detection unit which detects an inclination of the image capture apparatus; a display unit which displays the inclination of the image capture apparatus, and a predetermined reference orientation set for the image capture apparatus; a still state determination unit which determines that the image capture apparatus is in a still state, if a variation of the inclination falls within a predetermined range, and a reference orientation setting unit which sets the reference orientation of the image capture apparatus, wherein the reference orientation setting unit does not set the reference orientation if the still state determination unit determines that the image capture apparatus is not in the still state.

According to the second aspect of the present invention, there is provided a method of controlling an image capture apparatus, comprising: an inclination detection step of causing an inclination detection unit to detect an inclination of the image capture apparatus; a display step of causing a display unit to display the inclination of the image capture apparatus and a predetermined reference orientation set for the image capture apparatus; a still state determination step of causing a still state determination unit to determine that the image capture apparatus is in a still state, if a variation of the inclination falls within a predetermined range; and a reference orientation setting step of causing a reference orientation setting unit to set the reference orientation of the image capture apparatus, wherein in the reference orientation setting step, the reference orientation is not set if it is determined in the still state determination step that the image capture apparatus is not in the still state.

Further features of the present invention will become apparent from the following description of exemplary embodiments with reference to the attached drawings.

BRIEF DESCRIPTION OF THE DRAWINGS

FIGS. 2A and 2B are views for explaining the states of accelerations accepted by the image capture apparatus shown in FIG. 1;

FIG. 5 is a flowchart showing a procedure for processing of zero point position correction of the electronic level in the image capture apparatus shown in FIG. 1.

DESCRIPTION OF THE EMBODIMENTS

Figure 1:
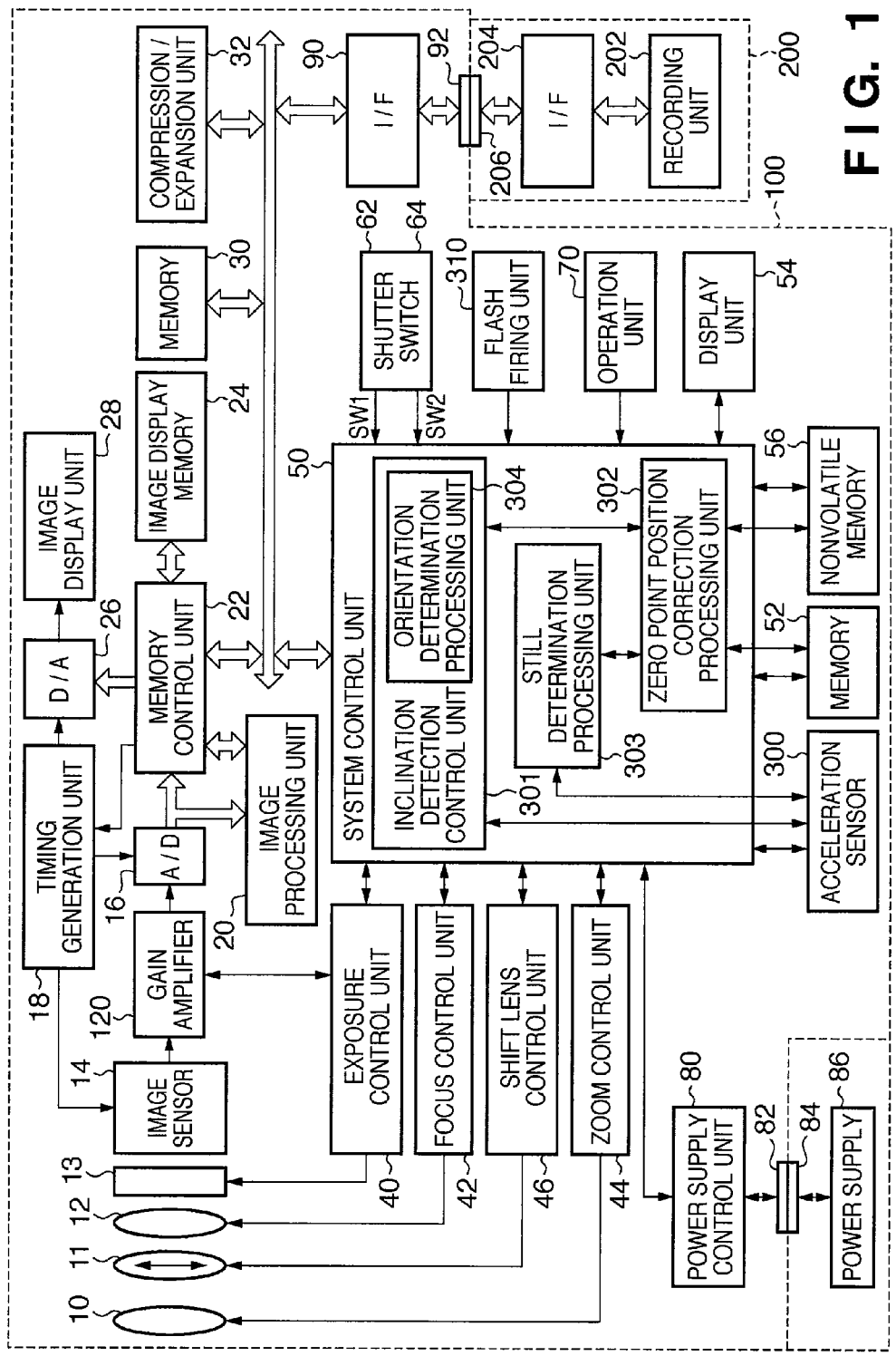
FIG. 1 is a block diagram showing the schematic configuration of an image capture apparatus according to an embodiment of the present invention.

An embodiment of the present invention will be described in detail below with reference to the accompanying drawings. FIG. 1 is a block diagram showing the schematic configuration of an image capture apparatus according to the embodiment of the present invention.

Referring to FIG. 1, an image capture apparatus 100 includes a scaling lens (to be referred to as a zoom lens hereinafter) 10, a vibration correction lens (to be referred to as a shift lens hereinafter) 11, a focus lens (to be referred to as a focusing lens hereinafter) 12, a stop/shutter unit 13 including a stop and a shutter, and an image sensor 14 which converts an optical image into an electrical signal. The shift lens 11 is disposed to be movable in a direction perpendicular to the optical axis, and can reduce blurring of an optical image formed via an optical system by driving in accordance with vibration or shake acting on the apparatus. The image capture apparatus 100 also includes a gain amplifier 120 which amplifies an analog output signal from the image sensor 14 to set a given camera sensitivity, and an A/D converter 16 which converts an analog output signal from the image sensor 14 into a digital signal.

The image capture apparatus 100 also includes a timing generation unit 18 which supplies a clock signal and a control signal to the image sensor 14, the A/D converter 16, and a D/A converter 26. The timing generation unit 18 is controlled by a memory control unit 22 and a system control unit 50.

The image capture apparatus 100 also includes an image processing unit 20. The image processing unit 20 performs predetermined pixel interpolation processing and color conversion processing for data from the A/D converter 16 or data from the memory control unit 22. The image processing unit 20 also performs predetermined arithmetic processing using captured image data. Based on the obtained arithmetic result, the system control unit 50 performs AF (AutoFocus) processing, AE (AutoExposure) processing, and EF (Electronic Flash pre-emission) processing of the TTL (Through The Lens) type to control an exposure control unit 40 and a focus control unit 42. The image processing unit 20 moreover performs predetermined arithmetic processing using captured image data, and performs AWB (Auto White Balance) processing of the TTL type based on the obtained arithmetic result.

The memory control unit 22 controls the A/D converter 16, the timing generation unit 18, the image processing unit 20, an image display memory 24, the D/A converter 26, a memory 30, and a compression/expansion unit 32. Data from the A/D converter 16 is written in the image display memory 24 or memory 30 via the image processing unit 20 and memory control unit 22 or directly via the memory control unit 22.

The system control unit 50 which controls the entire image capture apparatus 100 calculates a correct exposure value based on the luminance level obtained by TTL metering via the memory control unit 22, and controls the exposure control unit 40. An image display unit 28 which uses, for example, a TFT or an LCD displays image data for display, which is written in the image display memory 24, via the D/A converter 26. An electronic viewfinder function can be implemented by sequentially displaying image data captured using the image display unit 28.

The memory 30 is used to store a captured still image and moving image, and has a storage capacity sufficient to store a predetermined number of still images and a moving image for a predetermined time. This makes it possible to write images in the memory 30 in large amounts at high speed even in panoramic shooting or continuous shooting, in which a plurality of still images are continuously shot. The memory 30 can also be used as a working area for the system control unit 50. The memory 30 can moreover function as a storage unit which stores the information of the focus control unit 42 relative to the operation of a zoom control unit 44 serving as a scaling unit which scales an object image.

The compression/expansion unit 32 which compresses/expands image data by, for example, adaptive discrete cosine transformation (ADCT) reads an image stored in the memory 30, performs its compression processing or expansion processing, and writes the data having undergone the processing in the memory 30. A memory 52 stores, for example, a constant, variable, and program used to operate the system control unit 50.

The exposure control unit 40 controls the stop/shutter unit 13 having both a stop function and a shutter function. The focus control unit 42 controls focusing of the focusing lens 12. The zoom control unit 44 controls zooming of the zoom lens 10. A shift lens control unit 46 controls the shift lens 11 which is disposed to be movable in a direction perpendicular to the optical axis, and can reduce blurring of an optical image formed via an optical system by driving in accordance with vibration acting on the apparatus. The exposure control unit 40 and focus control unit 42 are controlled by the system control unit 50 using the TTL scheme, based on the arithmetic result obtained by arithmetically processing captured image data by the image processing unit 20.

A display unit 54 uses, for example, a loudspeaker or a liquid crystal display device which displays, for example, an operation status or a message using, for example, a text, an image, or a sound in accordance with execution of a program by the system control unit 50. A single or a plurality of display units 54 are provided at a single or a plurality of positions which are near an operation unit of the image capture apparatus 100 and are easily visually recognizable.

Of the display contents of the display unit 54, display contents displayed on, for example, an LCD include single-shot/continuous-shot image display, self-timer display, compression ratio display, recording pixel count display, recorded shot count display, remaining shot count display, shutter speed display, F-number display, and exposure correction display. Display contents displayed on, for example, an LCD also include red-eye reduction display, macrophotography display, buzzer setting display, remaining battery level display, error display, and information display which uses a number with a plurality of digits. Display contents displayed on, for example, an LCD moreover include display of the attachment/detachment of a recording medium 200, and date/time display. An electrically erasable/recordable nonvolatile memory 56 uses, for example, a flash ROM.

Although operation members 62, 64, and 70 used to input various operation instructions to the system control unit 50 use switches or dials in this embodiment, their functions may be provided on the display unit 54 using a touch panel. These operation members will be described in detail herein.

The shutter switch SW1 62 is turned on halfway through the operation of a shutter switch member (not shown) (by pressing it halfway), and instructs the start of an image capture preparatory operation for, for example, AF (AutoFocus) processing, AE (AutoExposure) processing, AWB (Auto White Balance) processing, and EF (Electronic Flash pre-emission) processing.

The shutter switch SW2 64 is turned on upon completion of the operation of the shutter switch member (not shown) (by pressing it fully), and instructs the start of a series of processing, including exposure processing. The series of processing includes herein exposure processing of writing a signal read from the image sensor 14 in the memory 30 via the A/D converter 16 and memory control unit 22, and development processing which uses arithmetic processing in the image processing unit 20 and memory control unit 22. The series of processing also includes recording processing of reading out image data from the memory 30, compressing it by the compression/expansion unit 32, and writing it on the recording medium 200.

An acceleration sensor 300 is a sensor which detects an acceleration acting on the image capture apparatus 100, and serves as an inclination detection unit. An inclination detection control unit 301 provided in the system control unit 50 performs processing of detecting a gravitational acceleration by the acceleration sensor 300 to detect the orientation of the image capture apparatus 100. An inclination status defined using a predetermined orientation as a reference position (zero point position) can be displayed on the image display unit 28 using the inclination angle of the image capture apparatus 100 detected by the inclination detection control unit 301. An orientation determination processing unit 304 of the inclination detection control unit 301 performs processing of determining whether the image capture apparatus 100 falls within a predetermined orientation range. The orientation determination processing unit 304 can simultaneously serve as a vibration detection unit, like a vibration detection sensor such as a gyro-sensor. Note that the orientation determination processing unit 304 can also be used for a method of detecting different components of vibration acting on the image capture apparatus 100, by simultaneously using a gyro-sensor and an acceleration sensor. Also, when the acceleration sensor 300 is used as a vibration detection unit, the output from the acceleration sensor 300 is sent to the shift lens control unit 46 and converted into an amount of driving of the shift lens 11 by the shift lens control unit 46. The shift lens control unit 46 drives the shift lens 11 based on the obtained amount of driving to make it possible to reduce blurring of an optical image formed via an optical system.

A zero point position correction processing unit 302 of the system control unit 50 is a circuit which performs processing of correcting the zero point position (reference orientation) of the orientation of the image capture apparatus 100. The angle relative to a zero point position (reference orientation setting) arbitrarily set with reference to the zero point position of the image capture apparatus 100, which is stored in the nonvolatile memory 56, is defined as a zero point position correction value and stored in the memory 52 or nonvolatile memory 56. The system control unit 50 also includes a still determination processing unit 303. The acceleration sensor 300 detects an acceleration different from gravitational acceleration or detects vibration acting on the image capture apparatus 100.

The operation unit 70 which uses, for example, various buttons or a touch panel can switch an image capture mode for performing image capture, and a playback mode for displaying a captured image on the image display unit 28. The operation unit also includes a menu button, set button, macro button, multiscreen playback/new page button, electronic flash set button, and single shooting/continuous shooting/self-timer switch button. The operation unit 70 can also be used to select settings corresponding to various image capture scenes as image capture modes such as not only an auto mode in which an image capture scene is automatically determined and set, a program mode, a stop priority mode, and a shutter speed priority mode, but also a night view mode, a child capture mode, a firework capture mode, and an underwater capture mode.

The operation unit 70 also includes a+(plus) menu move button, a−(minus) menu move button, a+(plus) playback image move button, a−(minus) playback image move button, .a shot quality select button, an exposure correct button, and a date/time set button.

A flash firing unit 310 calculates an appropriate amount Of firing based on the luminance level obtained by photometry using the system control unit 50, and performs firing control.

A power supply control unit 80 uses, for example, a battery detection circuit, a DC-DC converter, and a switch circuit which switches a block to be energized. The power supply control unit 80 detects battery attachment/detachment, the battery type, the remaining battery level, and the power supply voltage, controls the DC-DC converter based on the detection result and an instruction from the system control unit 50, and supplies the required voltage to each unit including a recording medium for a predetermined period of time.

A power supply 86 uses, for example, a primary battery such as an alkaline battery or a lithium battery, a secondary battery such as an NiMH battery or an Li-ion battery, and an AC adapter. The power supply control unit 80 and power supply 86 are connected to each other via connectors 82 and 84.

An interface and a connector complying with a relevant standard, such as SecureDigital (SD®) cards, may be used. The recording medium 200 includes a recording unit 202 which uses a semiconductor memory or a magnetic disk, an interface (I/F) 204 for interfacing with the image capture apparatus 100, and a connector 206 which performs connection to the image capture apparatus 100. Also, the image capture apparatus 100 includes a connector 92 which performs connection to the recording medium 200, and an interface 90 for interfacing with the recording medium 200.

The orientation detection operation of the image capture apparatus in this embodiment will be described below. The influence that an error generated in orientation information due to the influence of vibration or an acceleration externally accepted by the image capture apparatus exerts on zero point position correction processing for the orientation of the image capture apparatus will be described first.

An example of a method of detecting the orientation of the image capture apparatus will be explained first. FIG. 2A is a view showing the state of an acceleration accepted by the acceleration sensor 300 when the image capture apparatus 100 stands still. Referring to FIG. 2A, because the apparatus accepts neither external vibration nor an acceleration, the acceleration sensor detects only an acceleration g in the−(minus) Y-axis direction as a gravitational acceleration. A scale (setting result notification unit) shown on the lower side of FIG. 2A is used to indicate the orientation state of the image capture apparatus 100, and may be displayed on the image display unit 28 of the image capture apparatus 100 to visually present the orientation state of the image capture apparatus 100 to the operator. In this case, the center position of the scale is defined as the zero point position of the orientation of the image capture apparatus 100.

FIG. 2B shows the state in which the apparatus accepts a gravitational acceleration g in the −(minus) Y-axis direction and an external acceleration b in the−(minus) X-axis direction. At this time, the acceleration sensor erroneously detects an orientation inclined by a=arc tan (b/g), as shown in FIG. 2B. A scale shown on the lower side of FIG. 2B indicates the state in which the display position of the scale is shifted by an amount corresponding to a from the state of the scale shown on the lower side of FIG. 2A.

It is a common practice to determine the horizontal position of the image capture apparatus 100 as the zero point position when the above-mentioned orientation state is displayed. However, the photographer can desirably correct the zero point position to obtain an arbitrary orientation when, for example, he or she wants to allow the image capture apparatus 100 to capture an image while maintaining a desired inclination orientation or a horizontal position cannot be correctly detected because the acceleration level detected by the acceleration sensor 300 changes due to a change in environment such as temperature.

Figure 3:
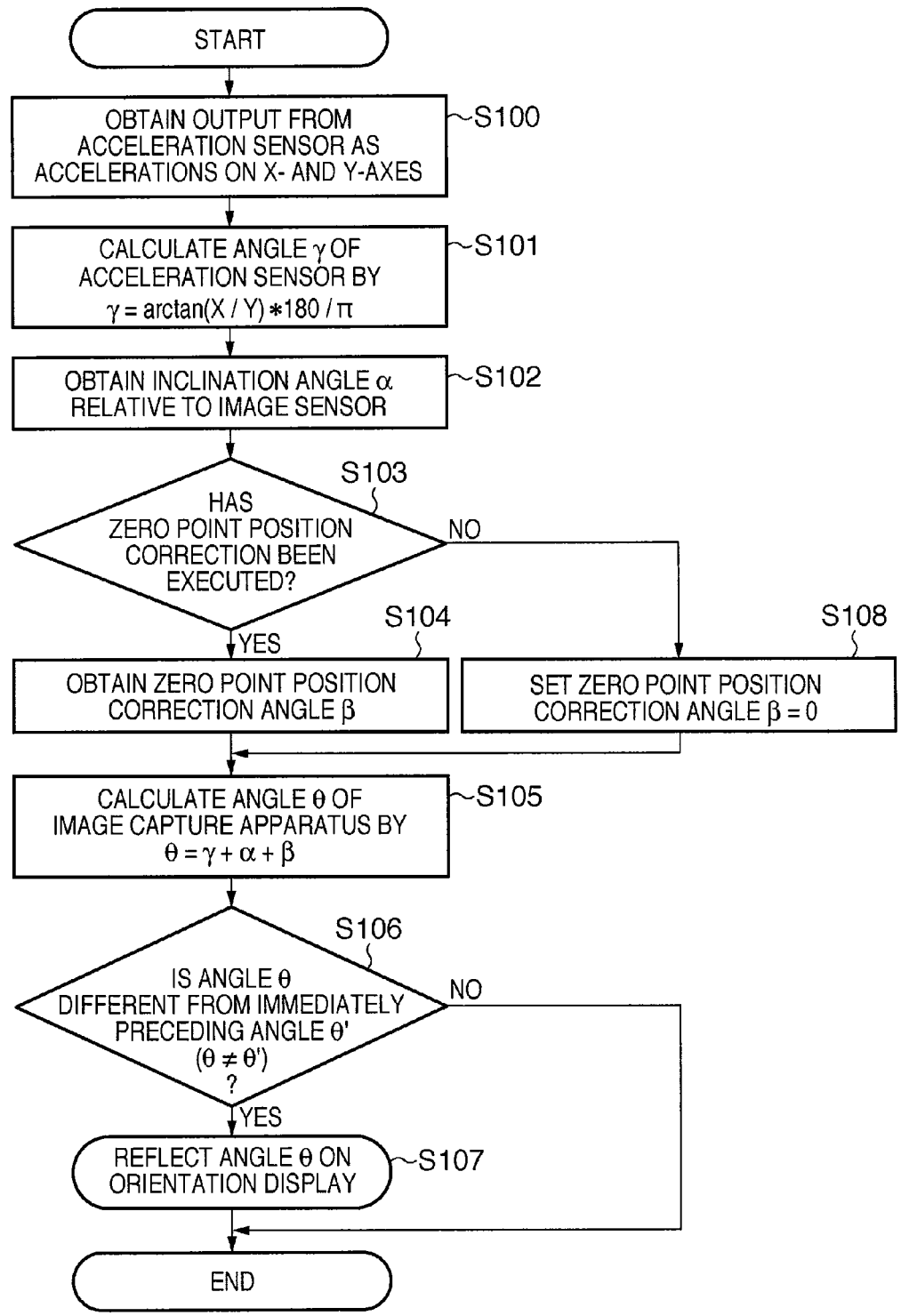
FIG. 3 is a flowchart showing a procedure for processing of a electronic level in the image capture apparatus shown in FIG. 1.

An example of the basic processing of a method of detecting the orientation of the image capture apparatus 100 will be explained with reference to FIG. 3.

Figure 4:
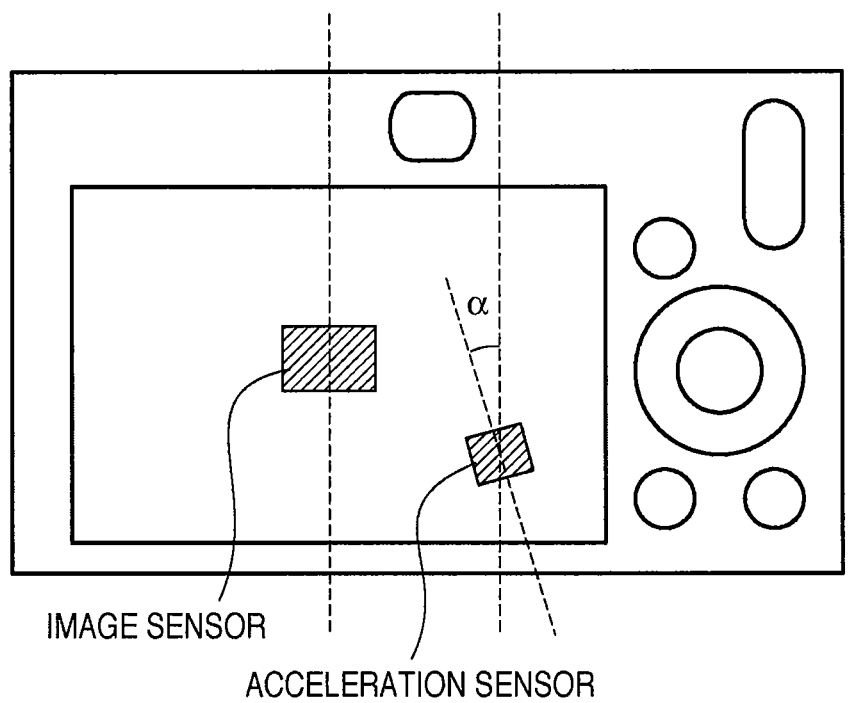
FIG. 4 is a view for explaining the relative angle between an image sensor and an acceleration sensor in the image capture apparatus shown in FIG. 1.

When processing of detecting the orientation of the image capture apparatus 100 starts, output values are obtained from the acceleration sensor 300 (S100). An inclination angle γ of the acceleration sensor 300 is calculated from the obtained output values of the acceleration sensor 300 (S101), and a relative angle a between the image sensor 14 and the acceleration sensor 300, which is stored in, for example, the nonvolatile memory 56 in advance, is obtained (S102). The relative angle α means the relative angular difference in the rotation direction between the image sensor 14 and the acceleration sensor 300 which are mounted in the image capture apparatus 100 upon assembly, as shown in FIG. 4.

When the above-mentioned zero point position correction function is provided, it is determined whether zero point position correction has been executed (S103). If zero point position correction has been executed (Yes in step S103), a zero point position correction angle β is obtained in step S104. The zero point position correction angle β is added to the inclination angle γ of the acceleration sensor 300 and the relative angle α between the image sensor 14 and the acceleration sensor 300 to calculate an angle θ of the image capture apparatus 100 (S105). This zero point position correction can be executed by, for example, selection in a menu mode of the operation unit 70, and either an image capture mode or a playback mode can be used for this correction in this embodiment.

At this time, to visually notify the photographer that zero point position correction has been executed, a text, an icon, or information such as a change in color of the scale which indicates the orientation of the image capture apparatus 100 may be displayed on, for example, the image display unit 28 (setting notification unit).

If zero point position correction has not been executed (No in step S103), the zero point position correction angle β is set to zero (S108), and is added to the inclination angle γ of the acceleration sensor 300 and the relative angle α between the image sensor 14 and the acceleration sensor 300 to calculate an angle θ of the image capture apparatus 100 (S105).

If the angle θ of the image capture apparatus 100 calculated in step S105 is different from an immediately preceding angle θ' of the image capture apparatus 100, the orientation state of the image capture apparatus 100 displayed on, for example, the image display unit 28 is updated (S107), and the orientation angle detection of the image capture apparatus 100 ends. If the angle θ of the image capture apparatus 100 is equal to the immediately preceding angle θ' of the image capture apparatus 100, the orientation angle detection of the image capture apparatus 100 directly ends.

The above-mentioned series of angle detection processing of the image capture apparatus 100 is repeated while the orientation state of the image capture apparatus 100 is displayed on, for example, the image display unit 28.

An example of processing for solving the problem resulting from zero point position correction mentioned above will be explained next with reference to FIG. 5.

In step S200, the still determination processing unit 303 provided in the system control unit 50 of the image capture apparatus 100 determines a still state of this apparatus. An example of a method of determining a still state will be explained herein. The still determination processing unit 303 samples the output values of the acceleration sensor 300 for a predetermined period of time. If the variation in sampled output value (detected value) falls within a range within which it does not influence the inclination detection result within a predetermined time, a still state is determined (still state determination).

When, for example, the image capture apparatus 100 is riding on an accelerating vehicle, precise orientation detection is impossible even in a still state. Hence, it is necessary to determine the influence of an acceleration other than a gravitational acceleration accepted by the image capture apparatus 100. An example of a method of determining the influence of an acceleration other than a gravitational acceleration will be explained below.

When the image capture apparatus 100 is free from the influence of an external acceleration in a still state, the acceleration detected by the acceleration sensor 300 includes only a gravitational acceleration g. The acceleration sensor 300 is a three-axis acceleration sensor which uses the X-, Y-, and Z-axes that are orthogonal to each other and can detect accelerations on the respective axes. Note that when the image capture apparatus 100 is free from an acceleration other than a gravitational acceleration, the acceleration obtained by composing the accelerations detected on the three axes is the gravitational acceleration g.

When the image capture apparatus 100 is free from an acceleration other than a gravitational acceleration, we have:

Composite Acceleration $\sigma = \sqrt{(\alpha x^2 + \alpha y^2 + \alpha z^2)} =$ Gravitational Acceleration $g$ where αx is the acceleration on the X-axis, αy is the acceleration on the Y-axis, and αz is the acceleration on the Z-axis.

Accordingly, when the image capture apparatus 100 is influenced by an acceleration other than a gravitational acceleration, Composite Acceleration σ≠ Gravitational Acceleration g. At this time, an acceleration level S (the difference between the composite acceleration and the gravitational acceleration) that does not influence the inclination detection result is defined as a threshold for a determination criterion. Then, if a condition:

Composite Acceleration σ<Gravitational Acceleration $g-S$ or

Composite Acceleration σ>Gravitational Acceleration $g+S$ is satisfied, it is determined that the image capture apparatus 100 is influenced by an acceleration other than a gravitational acceleration.

The still determination processing unit 303 performs still determination using one or both of the results of the variation in output value of the acceleration sensor 300 and the influence of an acceleration other than a gravitational acceleration.

If it is determined by still determination processing that the image capture apparatus 100 is in a still state (Yes in step S200), the orientation angle of the image capture apparatus 100 is calculated (S201). If the orientation angle at this time falls within a predetermined range (Yes in step S202), the angle relative to the zero point position is determined as a zero point position correction angle δ and stored in the memory 52 or nonvolatile memory 56 (S203), and completion of zero point position correction is displayed on the image display unit 28 (S204).

Figure 6A:
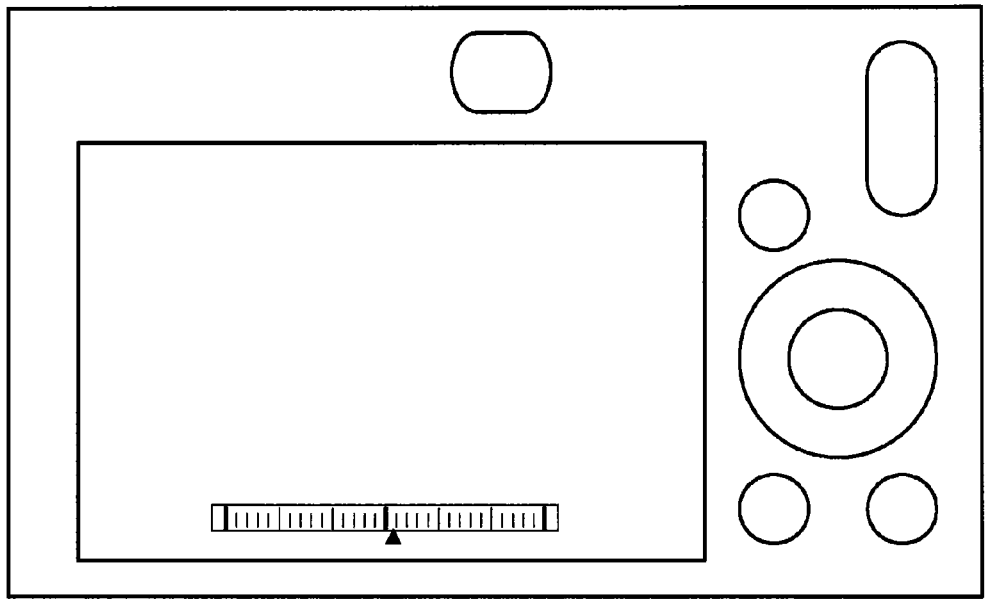
FIGS. 6A and 6B are views for explaining the orientation range within which zero point position correction of the image capture apparatus shown in FIG. 1 is possible.
Figure 6B:
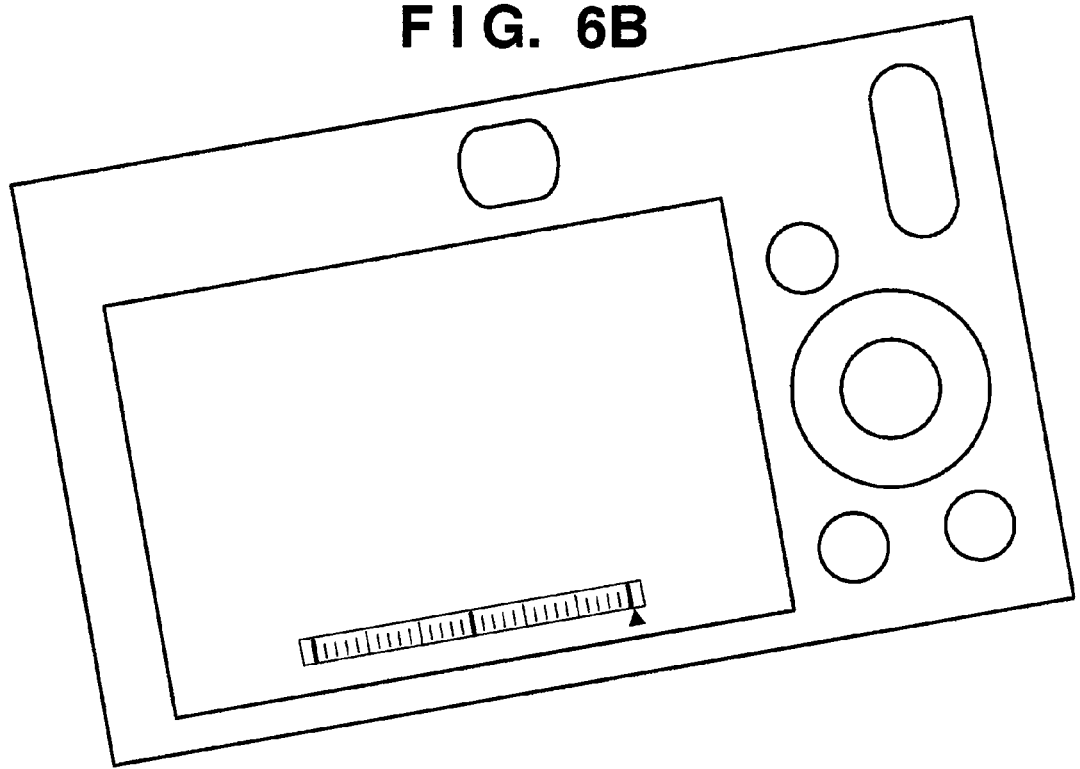

As for a determination criterion for the predetermined orientation angle determined in step S202 mentioned above, if the orientation of the image capture apparatus 100 falls within a range (within a display range) within which this orientation can be displayed on, for example, the image display unit 28, as shown in FIG. 6A, it is determined that the orientation of the image capture apparatus 100 falls within a predetermined orientation range. On the other hand, if the image capture apparatus 100 has an orientation that falls outside the display range, as shown in FIG. 6B, it is determined that the orientation of the image capture apparatus 100 falls outside the predetermined orientation range (No in step S202).

If it is determined by still determination processing in step S200 that the image capture apparatus 100 is not in a still state (No in step S200), failure in zero point position correction is displayed on the image display unit 28 (S205). If it is determined that the orientation angle falls outside the predetermined range (No in step S202) as well, failure in zero point position correction is similarly displayed on the image display unit 28 (S205).

If zero point position correction results in failure, as mentioned above, the immediately preceding zero point position correction angle is enabled without rewriting the zero point position correction angle δ.

Although the result of zero point position correction is displayed on the image display unit 28 as a unit which provides notification of this result in the above description, notification of the result of zero point position correction may be provided using a sound or an LED (neither is shown).

In a conventional image capture apparatus which does not take into consideration the influence of vibration or an acceleration accepted by the image capture apparatus, the zero point position is directly corrected despite the fact that an error of the orientation of the image capture apparatus is detected, as has been described with reference to FIG. 2B. However, according to the present invention, the probability that no desired image capture result can be obtained reduces because image capture is never performed upon adjusting the orientation of the image capture apparatus to the corrected zero point position despite failure in zero point position correction. Also, the zero point position is never corrected while the image capture apparatus 100 has an orientation that falls outside the range of a scale which indicates its orientation state, the orientation of the zero point position at the time of correction can always be specified. Moreover, if the zero point position is corrected by a very small amount with respect to the initial position, it is possible to prevent the photographer from capturing an image without determining whether the zero point position of the image capture apparatus 100 is the initial state or the corrected position state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-171178, filed Jul. 29, 2010, which is hereby incorporated by reference herein in its entirety.

What is claimed is:

1. An image capture apparatus comprising:
an inclination detection unit which detects an inclination of the image capture apparatus;
an inclination determination processing unit which determines whether the image capture apparatus falls within a predetermined inclination range;
a display unit which displays the inclination of the image capture apparatus and a predetermined reference orientation which can be set for the image capture apparatus;
a still state determination unit which determines that the image capture apparatus is in a still state, if a variation of the inclination falls within a predetermined range, and
a reference orientation setting unit which sets the reference orientation of the image capture apparatus,
wherein said reference orientation setting unit sets the detected inclination as the reference orientation, if the inclination determination processing unit determines that the image capture apparatus falls within a predetermined inclination range and said still state determination unit determines that the image capture apparatus is in the still state.

2. The apparatus according to claim 1, wherein said inclination detection unit is an acceleration sensor.

3. The apparatus according to claim 2, wherein said still state determination unit determines that the image capture apparatus is in the still state, if said acceleration sensor detects that the image capture apparatus does not accept an acceleration other than a gravitational acceleration within a predetermined time.

4. The apparatus according to claim 3, wherein said acceleration sensor detects accelerations on three axes that are orthogonal to each other,
wherein said still state determination unit determines that the image capture apparatus is in the still state, if a difference between a composite acceleration obtained by composing the accelerations on the three axes and the gravitational acceleration falls within a predetermined threshold range within the predetermined time.

5. The apparatus according to claim 1, wherein in setting the reference orientation by said reference orientation setting unit, a setting of the reference orientation is not changed if an orientation of the image capture apparatus falls outside a predetermined orientation range.

6. The apparatus according to claim 5, wherein the predetermined orientation range falls within an inclination display range within which said display unit which displays the orientation of the image capture apparatus performs display.

7. The apparatus according to claim 1, further comprising a setting result notification unit which provides notification of the setting result obtained by said reference orientation setting unit.

8. The apparatus according to claim 1, further comprising a setting notification unit which provides notification that the reference orientation is set, when the reference orientation is set by said reference orientation setting unit.

9. A method of controlling an image capture apparatus, comprising:
an inclination detection step of causing an inclination detection unit to detect an inclination of the image capture apparatus;
an inclination determination processing step of determining whether the image capture apparatus falls within a predetermined inclination range;
a display step of causing a display unit to display the inclination of the image capture apparatus and a predetermined reference orientation which can be set for the image capture apparatus;
a still state determination step of causing a still state determination unit to determine that the image capture apparatus is in a still state, if a variation of the inclination falls within a predetermined range; and
a reference orientation setting step of causing a reference orientation setting unit to set the reference orientation of the image capture apparatus based on the inclination,
wherein in the reference orientation setting step, the reference orientation is set, if it is determined in the inclination determination processing step that the image capture apparatus falls within a predetermined inclination range and it is determined in the still state determination step that the image capture apparatus is in the still state.

10. The method according to claim 9, wherein said inclination detection unit is an acceleration sensor.

11. The method according to claim 10, wherein said still state determination step determines that the image capture apparatus is in the still state, if said acceleration sensor detects that the image capture apparatus does not accept an acceleration other than a gravitational acceleration within a predetermined time.

12. The method according to claim 11, wherein said acceleration sensor detects accelerations on three axes that are orthogonal to each other, wherein said still state determination unit determines that the image capture apparatus is in the still state, if a difference between a composite acceleration obtained by composing the accelerations on the three axes and the gravitational acceleration falls within a predetermined threshold range within the predetermined time.

* * * * *